US007449684B2

(12) United States Patent
Mills et al.

(10) Patent No.: US 7,449,684 B2
(45) Date of Patent: Nov. 11, 2008

(54) MASS SPECTROMETER

(75) Inventors: Mark Duncan Mills, Manchester (GB); Stephen Paul Thompson, Manchester (GB)

(73) Assignee: Scientific Analysis Instruments Limited, Manchester (GB)

( * ) Notice: Subject to any disclaimer, the term of this patent is extended or adjusted under 35 U.S.C. 154(b) by 463 days.

(21) Appl. No.: 10/862,270

(22) Filed: Jun. 7, 2004

(65) Prior Publication Data

US 2005/0269502 A1 Dec. 8, 2005

(51) Int. Cl.
*B01D 59/44* (2006.01)

(52) U.S. Cl. .................................... 250/288; 250/423 P

(58) Field of Classification Search .............. 250/423 P, 250/288

See application file for complete search history.

(56) References Cited

U.S. PATENT DOCUMENTS 3,746,840 A * 7/1973 Ogland et al. ............... 235/473
5,594,243 A * 1/1997 Weinberger et al. ......... 250/288
6,762,405 B1 * 7/2004 Zhao et al. .................. 250/288

* cited by examiner

*Primary Examiner*—David Vanore
(74) *Attorney, Agent, or Firm*—Amster, Rothstein & Ebenstein LLP

(57) ABSTRACT

A mass spectrometer for analysis of a sample 5. A laser 1 is provided to illuminate at least part of the surface of the sample 5. Laser light is conducted via an optical fiber 2 and a zoom optical system 3 to the sample. A variable ion optical system 9,10,11 is provided to extract and focus ions released from the sample 5 onto a detector 12. The optical and ion optical systems operate continuously and synchronously to vary the fields of laser illumination and view of the sample such that they are substantially confocal and equal in diameter on the surface of the sample. The sample may be a MALDI sample.

13 Claims, 4 Drawing Sheets

MASS SPECTROMETER

FIELD OF THE INVENTION

The present invention relates to a mass spectrometer for the analysis of a sample by use of a laser.

BACKGROUND OF THE INVENTION

In analysis of a sample by mass spectrometry it is known to release molecules from the solid surface of a sample by the interaction of a sudden, intense beam of laser radiation. With this technique a significant number of such molecules are released as ions and it is known to collect and focus such ions into a time of flight mass spectrometer to facilitate the analysis of the surface and near surface regions of the sample. This technique is known as Laser Desorption Ionization Mass Spectrometry (LDI MS).

When a sample is composed principally of a low molecular weight aromatic matrix within which are dispersed trace quantities of analyte molecules of peptides and proteins then bio-molecules can be released from the sample. The mechanism for this release stems from the nature of the matrix molecules. Such molecules are chosen to contain a chromaphore structure which absorbs strongly at the wave length of the irradiating laser. Usually, this wavelength is within the ultra-violet part of the spectrum. When the laser radiation exceeds a threshold level of ~100-200 $J/m^2$ the matrix suffers a violent surface desorption as matrix material and included analyte molecules are released into vacuum. Ionization of the molecules is thought to occur subsequently by proton attachment as a by-product of the fragmentation of the matrix molecules which are rich in protons. The matrix in this 'matrix assisted' LDI thus has two purposes: one to enhance the absorption of the ultra-violet radiation and two, to provide a rich source of protons. This technique is well known as MALDI MS. It is known that different analytes can be desorbed preferentially in different matrices and that the optimum, threshold laser irradiance can differ for different analyte/matrix combinations. It is, therefore, necessary to be able to vary the laser irradiance incident upon the sample and this is conventionally accomplished using some form of variable neutral density filter to achieve attenuation of the laser beam. A disadvantage of this method is that precious laser light which could be used for analysis of the sample is irretrievably lost in the attenuator. This extends the experimental timescales for this type of analysis.

SUMMARY OF THE INVENTION

It is an object of embodiments of the present invention to provide a laser desorption mass spectrometer having means for varying the laser irradiance of sample, but without the problems associated with such prior art systems.

According to the present invention there is provided a mass spectrometer for analysis of a sample, the mass spectrometer comprising a laser arranged to illuminate at least part of the surface of a sample to irradiate a sample and a variable optical system is provided which enables the area of the sample illuminated by the laser to be varied.

Provision of a variable optical system enables the area of illumination of a sample to be varied without any significant loss of laser light, which provides for improved efficiency over prior art systems.

The variable optical system may be a zoom optical system and may be a multi element system. In one embodiment it has at least three, preferably at least five elements. The variable optical system preferably allows for continuous variation of the area of illumination of the sample, although embodiments are possible where stepwise variation is possible. Where variation is stepwise a neutral density filter may be provided in order to provide for a smooth variation of irradiated energy. In one embodiment the variable optical system allows laser light to be focused onto a sample support to illuminate a substantially circular area of the support with a diameter between 100 and 900 microns, with respective divergence angles of 600 to 150 milli-radians. The zoom range may be about four times.

In one embodiment, the laser comprises a nitrogen discharge tube. With this system the pulsed beam of photons released from the laser cavity is composed of a number of different propagation modes which sum according to the principle of superposition to produce a pulsed beam and the intensity distribution of this beam can be highly inhomogeneous. The propagation modes can be mixed by coupling the output pulse of photons from the laser cavity to an optical fiber, typically of length one or more meters. The intensity distribution at the output end of the optical fiber resembles a 'top hat' distribution function, albeit with a large dispersion angle. The etch pit produced in an irradiated sample by this method is highly homogeneous with a sharp cut off at the edge of the focused laser beam. As analysis using this type of instrument is concerned with the concentration of a particular element or elements as a function of depth into the near surface region of a sample, it is preferred that laser light from the laser is conducted to the zoom optical system via an optical fibre. The optic fibre preferably has a length of at least half a meter, more preferably at least a meter. The optical fibre preferably has a diameter in the range 100 to 600 microns.

The laser and its associated variable optical system are preferably arranged to irradiate a sample with an energy density of between about 100 $J/m^2$ and about 1000 $J/m^2$.

The mass spectrometer preferably also includes an ion optical system to focus ions released from a sample being analysed. The ion optical system is preferably variable to enable the area of the sample from which ions will be focused to be varied.

The optical and ion optical systems are preferably arranged to be substantially confocal. They are also preferably arranged to focus substantially the same area on the surface of a sample. That is to say that the laser illuminates an area of the sample and the ion optical system focuses ions released from substantially the illuminated area. The ion optical system preferably focuses released ions on to a detector.

BRIEF DESCRIPTION OF THE DRAWINGS

In order that the invention may be more clearly understood embodiments thereof will now be described by way of example with reference to the accompanying drawings of which.

DETAILED DESCRIPTION OF EMBODIMENTS OF THE INVENTION

Figure 1:
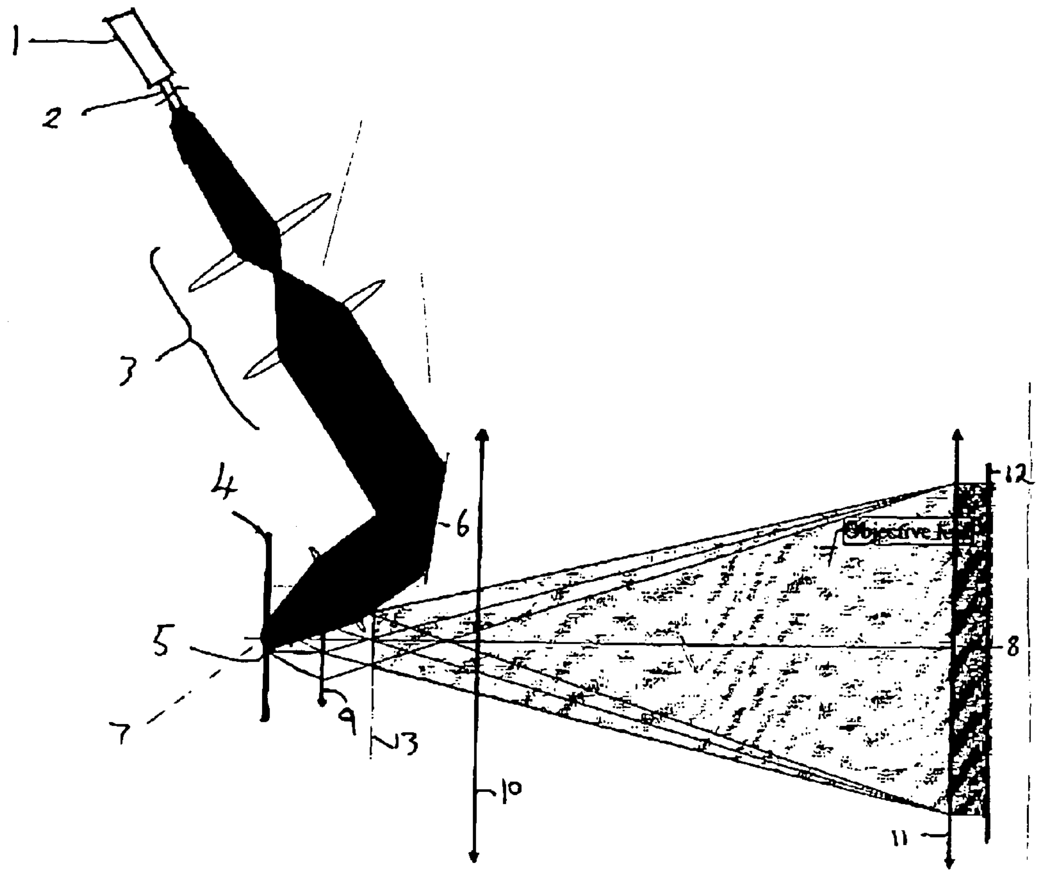
FIG. 1 is a schematic view of a mass spectrometer according to the invention.

Referring to the drawings a mass spectrometer comprises a pulsed Nitrogen laser 1 which directs a beam into an optical fiber 2 of length about 1.5 meters and diameter about 400 microns. Laser light emerging from the fiber will be of uniform intensity over a diameter of about 400 microns with an angular divergence of about 300 milli-radians.

Light emerging from the optical fibre 2 is directed into a multi element zoom optical system 3 having an optical axis 7 and arranged to focus light from the fiber 2, by way of a mirror 6, onto a sample to be analyzed 4, mounted on a sample support 5. The zoom optical system is continuously variable and enables light emerging from the fiber to be focused onto the sample support as a substantially circular spot with a diameter of between about 200 and 800 microns with respective divergence angles of about 600 and 150 milli-radians. This enables the irradiated energy density provided by the laser onto the sample to be smoothly varied.

Figure 2:
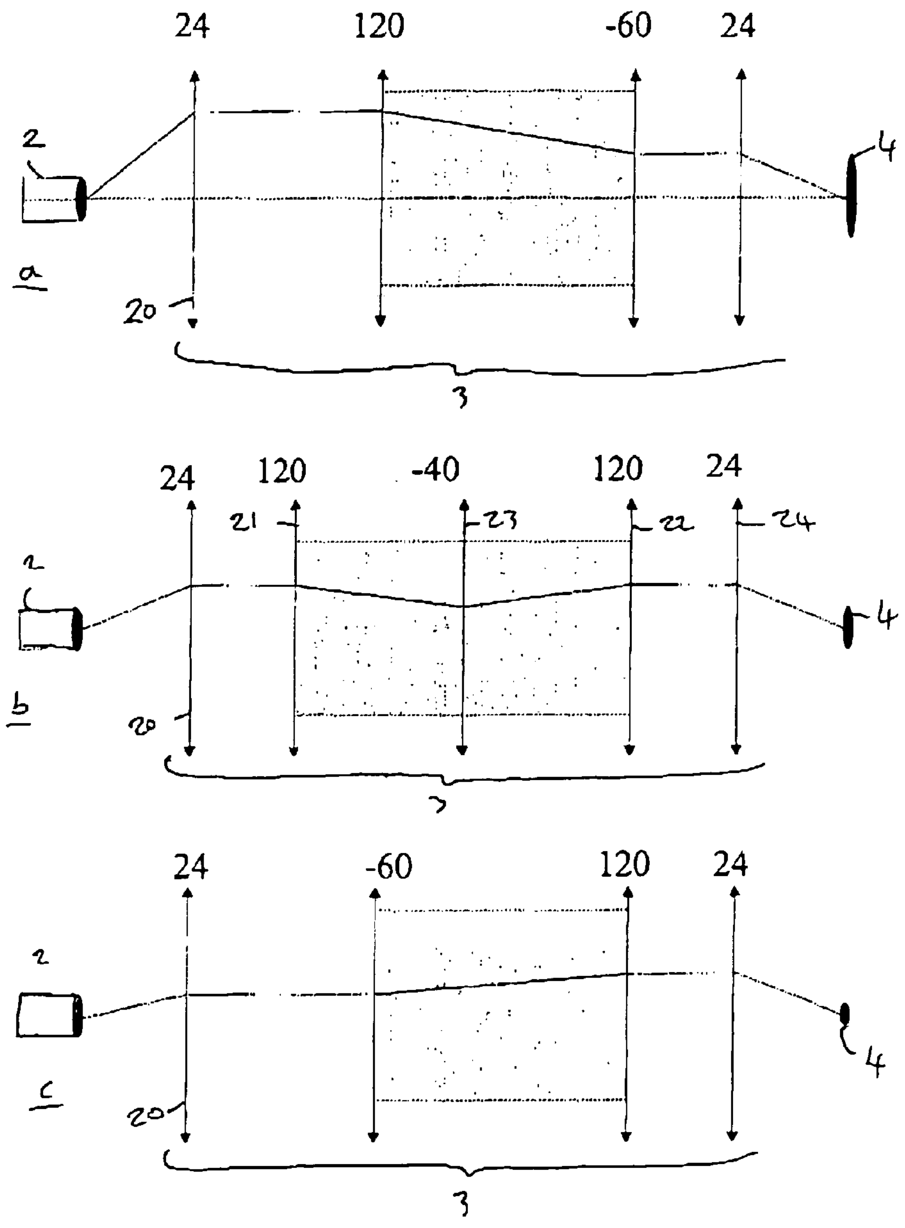
FIGS. 2_a-c_ are schematic views of the light optical system of the mass spectrometer of FIG. 1 in various operational states.

Referring to FIGS. 2*a-c* in particular the zoom optical system comprises five elements. Laser light emerging from the optical fibre 2 is collected by a positive input lens 20 of focal length 24 mm. Ray bundles from any point on the disc of illumination formed by the fibre 2 are formed into a parallel ray bundle by the input lens 20.

The parallel ray bundle exiting the input lens 20 enters the zoom kernel. This comprises three lenses, two positive lenses 21,22 of focal length 120 mm disposed on opposite sides of a negative lens of focal length −40 mm. The first positive lens 21, adjacent the input lens 20, and the negative lens 23 are arranged to move relative to the third positive lens 22, and each other, in order to vary the magnification provided by the zoom optical system whilst delivering an infinity conjugate ray bundle to an objective lens 24, formed by a positive lens of focal length 24 mm. The objective lens directs a beam of laser light onto a sample 4. Adjustment of the magnification of the zoom optical system varies the area of the sample 4 illuminated by laser light.

The position of lenses 21 and 23 of the zoom kernel may be adjusted continuously between a maximum magnification configuration illustrated in FIG. 2*a,* via an intermediate configuration illustrated in 2*b* to a minimum magnification configuration illustrated in FIG. 2*c*.

In the maximum magnification configuration of FIG. 2*a* both the first 21 and second 23 lenses of the zoom kernel are moved away from the input lens 20, towards the third lens of the zoom kernel 22 to a maximum excursion. In this position the second, negative, lens 23 forms a compound lens with the third lens 22. The compound lens is a positive lens of focal length 120 mm. To reduce the magnification the first 21 and second 23 lenses are moved away from the third lens 22 towards the input lens 21 until the intermediate position of FIG. 2*b* is reached. Thereafter, magnification is further reduced by continuing to move the third lens 23 towards the input lens 20 whilst moving the first lens 21 away from the input lens 20 towards the second lens 23 until the first and second lenses 21,23 form a compound negative lens of focal length −60 mm. This is the minimum magnification configuration of FIG. 2*c*.

The zoom optical system enables transfer of pulsed disc of laser light to be transferred to a sample 4 substantially without any attenuation or loss whilst enabling the density of irradiance of the sample to be varied continuously by adjusting the area of illumination of the sample.

Of course any other suitable zoom optical system can be employed as will be apparent to one of skill in the art.

Laser light focused onto the sample support 5 or a sample on the support 4 has an optical axis 7 corresponding to that of the zoom optical system and this is confocal (i.e. coincident and independently focused) with the ion optical axis 8 of the mass spectrometer.

Spaced in front of the sample holder 5 are three spaced apart electrostatic lenses, a first lens 9 and low 10 and high 11 magnification lenses, in that order having an ion optical axis 8. These lenses form a zoom ion optical system and act to extract ions from the sample 4 and focus them on to a detector 12. The lenses may comprise annular ring electrodes, or any other suitable electrodes as will be understood by one of ordinary skill in the art.

The properties of the ion optical system are related to the extraction gap distance between the sample support 5, which, in use, is held at a high potential, and the first electrode 9 which is, in use, grounded. Together they give rise to an ion extraction field. The ion optical system comprises an electrostatic immersion lens which has the property of presenting a virtual pupil plane several times the extraction gap distance to the left of the sample electrode (as illustrated). A real embodiment of this pupil plane 13 is formed to the right (as illustrated) of the sample support by the first lens 9 such that the distance of any ray from the ion optical axis 8 in the pupil plane is proportional to the angle with respect to the sample normal and is independent of the size of the field of view. This pupil represents the smallest ion optical entity containing all possible trajectories which may be brought to focus onto the detector.

The ion optical system is variable to enable the field of view of a sample 4 visible to the detector 12 to be continuously varied from a minimum area to a maximum area. In FIG. 1 the ion optical system is shown operating in a high magnification mode, that is to say that the field of view is of minimum size. In this mode the field image of the sample 4 is cast into the plane of the high magnification lens 11 by the first lens 9. This has the effect of revealing a real pupil 13 in a position approximately one focal length to the right (as illustrated) of the first lens 9. This is brought into focus by the high magnification lens 11 and collimated onto the detector 12.

Figure 3:
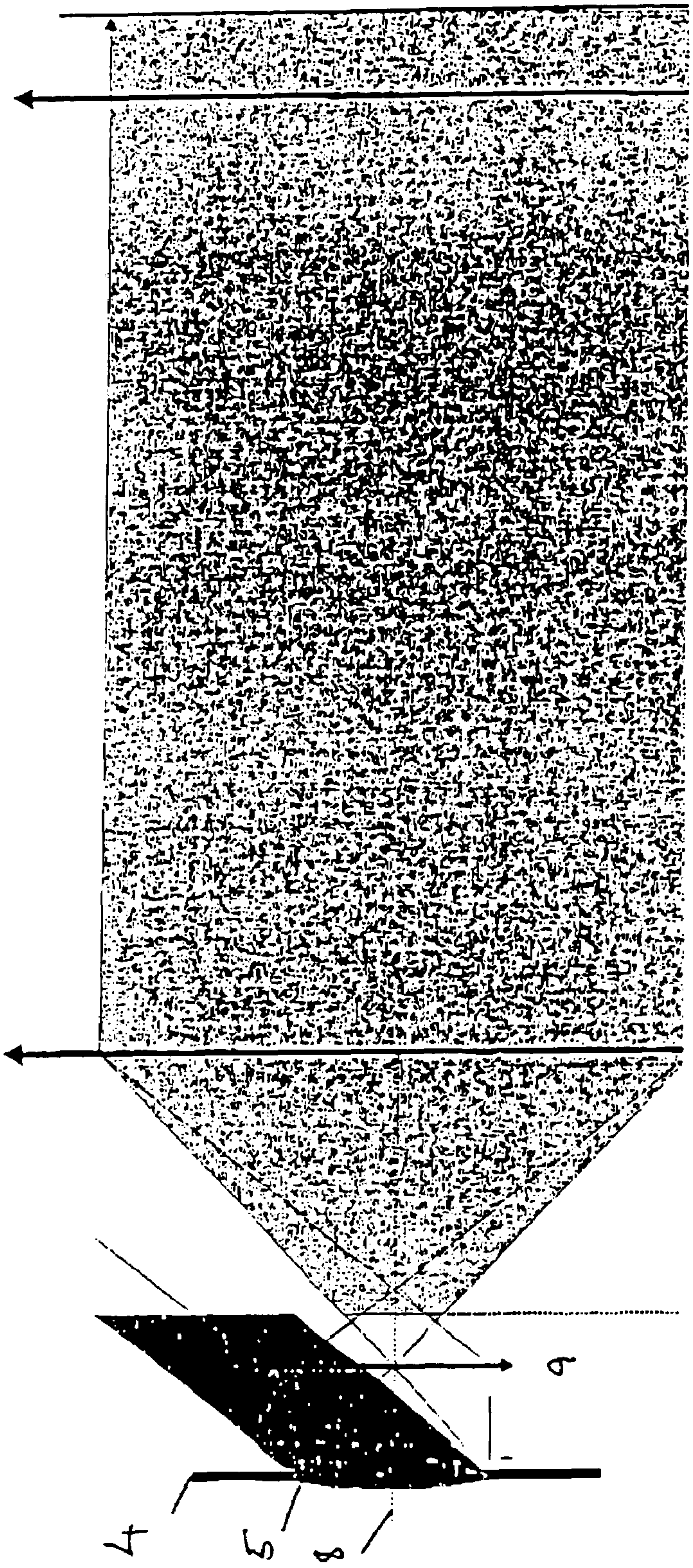
FIG. 3 is a schematic view of the ion optical system of the mass spectrometer of FIG. 1 in a low magnification mode.

FIG. 3 shows the ion optical system operating in a minimum magnification mode, where the field of view of the sample 4 is of a maximum area. In this configuration the field of view of the sample 5 is cast into the plane of the low magnification lens 10. This has the effect of revealing a real pupil in a position approximately one focal length to the right (as illustrated) of the first lens 9. This pupil is brought into focus by the low magnification lens 10 and collimated onto the detector 12.

Figure 4:
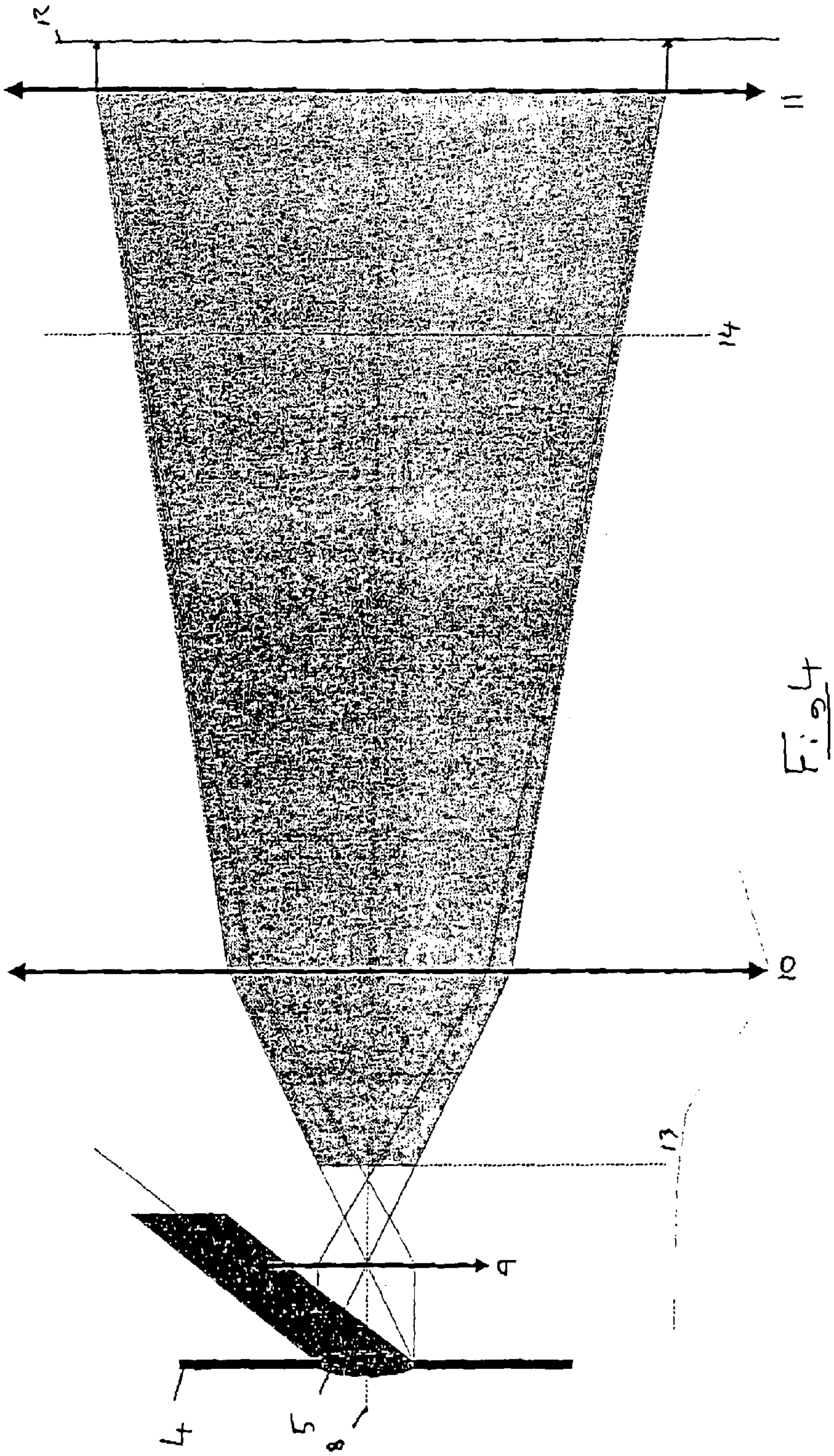
FIG. 4 is a schematic view of the ion optical system of the mass spectrometer of FIG. 1 in an intermediate magnification mode.

The arrangements illustrated in FIGS. 1 and 3 show the two bounding configurations for operation of the ion optical system in which the diameters of the field of view of the sample 4 differ by a factor of approximately four. This corresponds approximately to the zoom ratio afforded by the laser zoom optical system 3. The field of view of the ion optical system may be varied continuously between the two bounding configurations by varying the excitation of the first lens 9 and low 10 and high 11 magnification lenses. An intermediate operational configuration of the ion optical system is illustrated in FIG. 4. In this configuration the intermediate field on the sample 5 is cast into a plane 14 between the low 10 and high magnification lenses. The real pupil at 13 is then collimated onto the detector 12 by the action of both the low 10 and high 11 magnification lenses.

Of course any other suitable zoom ion optical system can be employed as will be apparent to one of skill in the art.

The described embodiment confers numerous advantages. Introducing pulsed laser light into an optical fibre has the action of mode mixing such that the emerging beam can be focused into a sharp spot with a top hat distribution. The action of a zoom optical system on the emerging beam makes it possible to vary the illuminated area on a sample electrode whilst maintaining the 'top hat' distribution. The zoom ion optical collection system can similarly be optimized and adjusted such that the collection area is matched confocally to the area illuminated by the laser. The ion and (laser) light optical systems may vary continuously and synchronously the fields of view of both the laser illumination and the ion collection systems such that they are confocal and equal in diameter on the surface of a sample, such as a MALDI sample. The diameter may be determined by the requirement to hold the laser energy density at a value between ~100 $J/m^2$ and ~1,000 $J/m^2$.

The above embodiment is described by way of example only. Many variations are possible without departing from the scope of the invention as defined by the following claims.

The invention claimed is:

1. A mass spectrometer for analysis of a sample, the mass spectrometer comprising a laser arranged to illuminate at least part of the surface of a sample to irradiate the sample, and a variable optical system comprising a zoom lens operative to enable the area of the sample illuminated by the laser to be varied.

2. The mass spectrometer of claim 1, wherein the variable optical system is continuously variable.

3. The mass spectrometer of claim 1, wherein the variable optical system is a multi-element system.

4. The mass spectrometer of claim 1 comprising a sample support and wherein the variable optical system enables light from the laser to be focused onto a substantially circular area of the support with a diameter of between 100 and 900 microns.

5. The mass spectrometer of claim 1 comprising a sample support and wherein the variable optical system enables light from the laser to be focused onto a substantially circular area of the support with a divergence angle in the range 600 to 150 milli radians.

6. The mass spectrometer of claim 1 comprising an optical fibre via which light from the laser is conducted to the variable optical system.

7. The mass spectrometer of claim 1 comprising an optical fibre via which light from the laser is conducted to the variable optical system wherein the fibre has a length of at least half a meter.

8. The mass spectrometer of claim 1 comprising an optical fibre via which light from the laser is conducted to the variable optical system wherein the fibre has a length of at least one meter.

9. The mass spectrometer of claim 1 comprising a sample support and arranged to irradiate a sample on the sample support with light from the laser at an energy density of between 100 and 10000 joules/m.sup.2.

10. The mass spectrometer of claim 1 comprising a variable ion optical system.

11. The mass spectrometer of claim 1 comprising a variable ion optical system which is substantially confocal with the variable optical system.

12. The mass spectrometer of claim 1 comprising a variable ion optical system and wherein the variable optical system and ion optical systems are arranged to vary continuously and synchronously the fields of laser illumination and view of a sample.

13. The mass spectrometer of claim 1 comprising a variable ion optical system and wherein the variable optical system and ion optical systems are arranged to vary continuously and synchronously the fields of laser illumination and view of a sample such that they are substantially confocal and equal in area on the surface of the sample.

* * * * *